US006675023B1

(12) United States Patent
Tamukai

(10) Patent No.: US 6,675,023 B1
(45) Date of Patent: Jan. 6, 2004

(54) STAND-BY SYSTEM

(75) Inventor: Kiyoshi Tamukai, Tokyo (JP)

(73) Assignee: NEC Corporation, Tokyo (JP)

( * ) Notice: Subject to any disclaimer, the term of this patent is extended or adjusted under 35 U.S.C. 154(b) by 359 days.

(21) Appl. No.: 09/616,674

(22) Filed: Jul. 14, 2000

(30) Foreign Application Priority Data

Jul. 16, 1999 (JP) ............................................ 11-202805

(51) Int. Cl.[7] .............................. H04Q 7/20; H04B 1/38; H04M 1/00
(52) U.S. Cl. ......................... 455/552; 455/426; 455/462; 455/553
(58) Field of Search ................................. 455/550, 552, 455/553, 334, 403, 426, 432, 552.1, 553.1, 426.1, 425, 432.2, 432.1, 461, 462

(56) References Cited

U.S. PATENT DOCUMENTS

| | | | | |
|---|---|---|---|---|
| 5,442,680 A | * | 8/1995 | Schellinger et al. | 455/426.1 |
| 5,524,118 A | | 6/1996 | Kim et al. | |
| 5,550,895 A | * | 8/1996 | Burson et al. | 455/552.1 |
| 5,870,673 A | * | 2/1999 | Haartsen | 455/426.1 |
| 5,999,823 A | * | 12/1999 | Yoneyama et al. | 455/552.1 |
| 6,011,960 A | * | 1/2000 | Yamada et al. | 455/77 |
| 6,185,435 B1 | * | 2/2001 | Imura | 455/552.1 |
| 6,198,820 B1 | * | 3/2001 | Tetsushi | 379/413 |
| 6,459,688 B1 | * | 10/2002 | Bursztejn et al. | 370/329 |
| 6,466,553 B1 | * | 10/2002 | Wakamatsu | 370/311 |
| 6,487,410 B1 | * | 11/2002 | Kontio et al. | 455/437 |

FOREIGN PATENT DOCUMENTS

| | | |
|---|---|---|
| JP | 4-287434 | 10/1992 |
| JP | 6-343189 | * 12/1994 |
| JP | 9-9348 | 1/1997 |
| JP | 11-317984 | 11/1999 |

OTHER PUBLICATIONS

Japanese Office Action dated Oct. 9, 2001, with partial English translation.

* cited by examiner

Primary Examiner—Nay Maung
Assistant Examiner—Edan Orgad
(74) Attorney, Agent, or Firm—McGinn & Gibb, PLLC

(57) ABSTRACT

A flip-flop circuit 23 receives timing signals from a plurality of waiting timer circuits 24 and 25, and generates a mode switching signal to a radio unit 21 and a control unit 22. The radio unit 21 and control unit 22 are common to a plurality of systems for transmission and reception of data from and by an antenna 26.

20 Claims, 3 Drawing Sheets

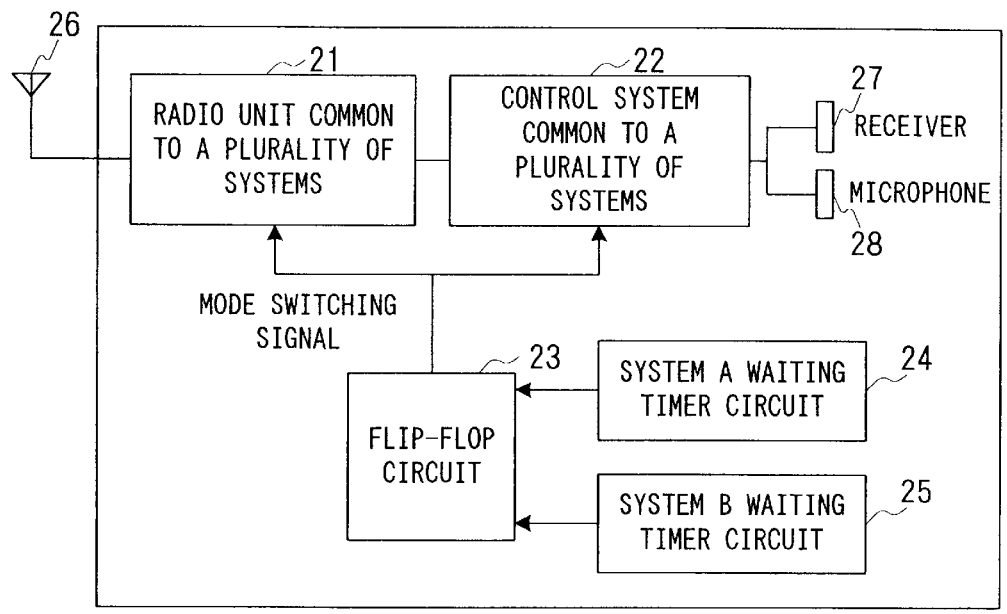

FIG.3
(1) IN CASE OF DEVIATION IN TIMING BETWEEN PDC AND PHS
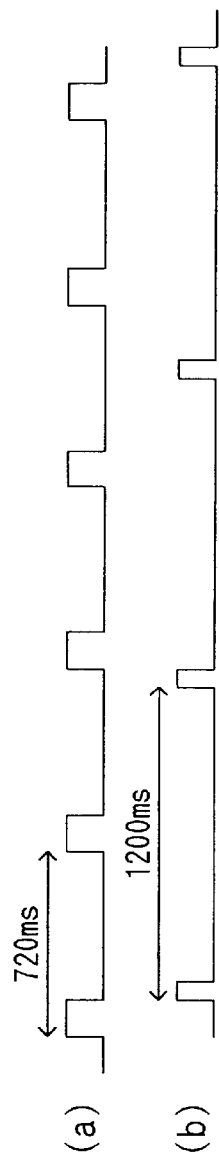
(2) IN CASE OF SYNCHRONIZATION IN TIMING BETWEEN PDC AND PHS
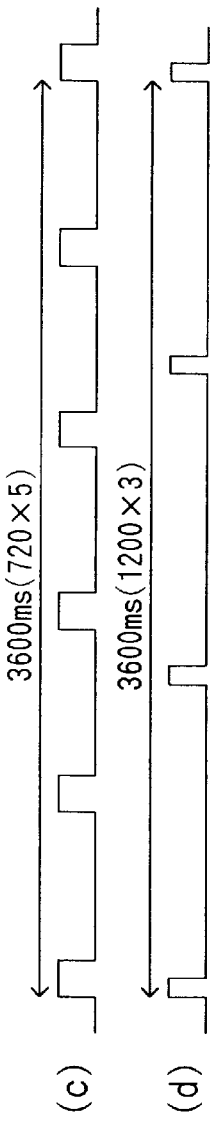

STAND-BY SYSTEM

BACKGROUND OF THE INVENTION

The present invention relates to stand-by (i.e., receiving-after-waiting) systems and, more particularly, to stand-by systems for radio communication systems such as portable telephone systems.

Recent popularization of data communication is making it impossible to attain the end solely with conventional wired communication systems, and radio mobile (or portable) communication media such as cellular telephone, cordless telephone, PHS (Personal Handy phone System) and portable telephone are becoming rapidly spread. In addition, a plurality of different radio communication systems usually coexist in the same place or district.

From the standpoint of the user's convenience, it is preferable that one portable unit can utilize a plurality of different communication systems. Accordingly, Japanese Patent Laid-Open No. 6-343189, for instance, discloses a mobile communication unit, which has a transmitting/receiving circuit for cellular telephone service and one for cordless telephone service. FIG. 4 is a block diagram showing such a prior art mobile communication unit.

This mobile communication unit comprises a receiving circuit 2 for cordless telephone, a demodulating circuit 3 for cordless telephone, a transmitting circuit 5 for cordless telephone, a modulating circuit 4 for cordless telephone, a receiving circuit 6 for cellular telephone, a demodulating circuit 7 for cellular telephone, a modulating circuit 8 for cellular telephone, a transmitting circuit 9 for cellular telephone, a microprocessor 10, a non-volatile memory 11, a key input unit 12 and a display unit 13.

When this mobile communication unit is in a pertaining cellular telephone system service area, it catches a control channel sent out from a cellular telephone base station, system control data is received via the antenna 1 in the cellular telephone service receiving circuit 6, demodulated in the demodulating circuit 7 and analyzed in the microprocessor 10. Thus, the analyzed result is displayed on the display 13 that it is in a cellular telephone system service area. When the mobile communication unit is moved to a cordless telephone service area, it catches a control channel sent out from the base station of the cordless telephone service system, system control data is received via the antenna 1 in the cordless telephone service receiving circuit 2, demodulated in the demodulating circuit 3 and analyzed in the microprocessor 10. Thus, the result of the analysis is displayed on the display 13. In these cases, the signals obtained by the modulating circuits 8 and 4 are transmitted fro the antenna 1 via the transmitting circuits 9 and 5. The non-volatile memory 11 stores contents of ranking priority selection to meet the user's will of utilizing inexpensive communication fee systems.

The above prior art mobile communication unit has the following problems. In the first place, concerning the stand-by no consideration is given to the utilization of a plurality of different systems. In addition, when transmitting data, switching, although automatic, is performed to only a single system before use. This means that the unit can always use only a single system even when it is subscribed to a plurality of different systems. Secondly, a set of transmitting and receiving circuits are provided for each system, and this can not be sufficient in view of the cost, current consumption and weight.

SUMMARY OF THE INVENTION

An object of the present invention, accordingly, is to provide a stand-by system capable of eliminating or providing improvement over the above problems inherent in the prior art.

According to first aspect of the present invention, there is provided a stand-by system adopted in a portable terminal having a common antenna for transmitting and receiving data to and from a plurality of systems, including a waiting control circuit for providing a mode switching signal to a plurality of systems to render these systems to be in a stand-by state at the same time.

The waiting control circuit provides timing signals each corresponding to each of the plurality of systems. The plurality of systems each have a radio unit and a control unit, these units being common to all the systems. The plurality of systems includes at least a digital cellular phone (PDC) system and a personal handy phone (PHS) system. The waiting control circuit includes a plurality of waiting timer circuits each for generating a waiting timing signal corresponding to each of the plurality of systems, and a flip-flop circuit for receiving the waiting timing signals and providing corresponding mode switching signals. The waiting timer circuits include those providing timing signals in cycles of 720 and 1,200 msec. When a plurality of waiting timing signals are coincident in timing, the system performs the operation until it can receive the data in the next timing.

According to a second aspect of the present invention, there is provided a stand-by system for a plurality of systems including: a radio unit common to the plurality of systems; a control unit common to the plurality of systems; a timing signal generating means for generating a plurality of waiting timing signals for the plurality of systems; and mode selecting means for generating a mode selection signal to select a system function of the plurality of systems in the radio unit and the control unit on the basis of the waiting timing signal from the timing signal generating means.

The mode selecting means is a flip-flop circuit which receives the waiting timing signal and generates the corresponding mode selection signal. The mode selecting means is a flip-flop circuit which receives the waiting timing signal and generates the corresponding mode selection signal. The plurality of systems includes at least a digital cellular phone (PDC) system and a personal handy phone (PHS) system.

According to a third aspect of the present invention, there is provided a stand-by system for a plurality of systems including: a body including a radio unit common to the plurality of systems, a control unit common to the plurality of systems, a timing signal generating means for generating a plurality of waiting timing signals for the plurality of systems; and mode selecting means for generating a mode selection signal to select a system function of the plurality of systems in the radio unit and the control unit on the basis of the waiting timing signal from the timing signal generating means, a receiver and a microphone, and an antenna 26.

When a plurality of waiting timing signals are coincident in timing, the system performs the operation until it can receive the data in the next timing.

Other objects and features will be clarified from the following description with reference to attached drawings.

BRIEF DESCRIPTION OF THE DRAWINGS

FIG. 1 is a block diagram showing the construction of a preferred embodiment of the stand-by system according to the present invention;

FIG. 2 is a block diagram showing a specific example of a system underlying the basic principle of the stand-by system shown in FIG. 1 according to the present invention;

FIG. 3 are timing charts for describing the operation of the portable terminal shown in FIG. 2.

PREFERRED EMBODIMENTS OF THE INVENTION

Figure 4:
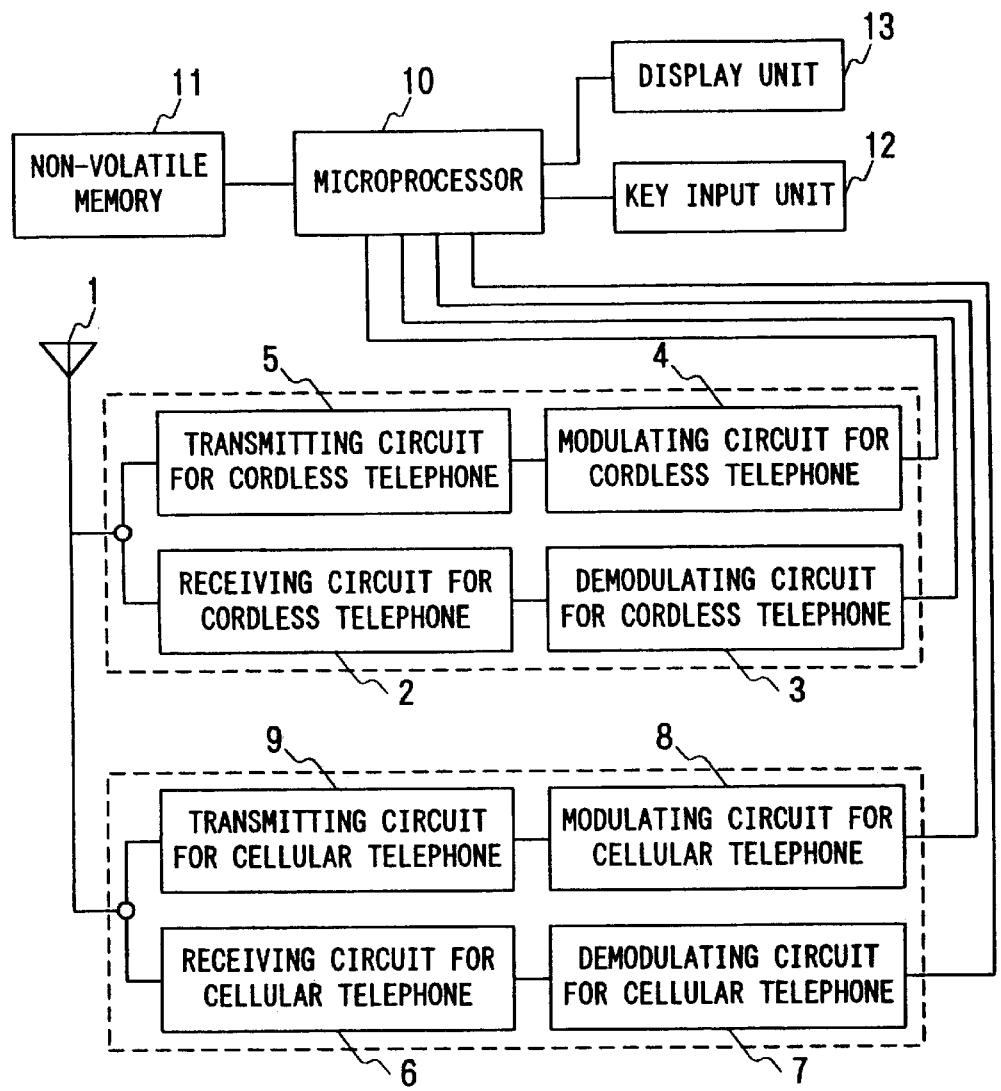
FIG. 4 is a block diagram showing such a prior art mobile communication unit.

Preferred embodiments of the present invention will now be described with reference to the drawings.

FIG. 1 is a block diagram showing the construction of a preferred embodiment of the stand-by system according to the present invention. This stand-by system includes a body including a radio unit 21 common to a plurality of systems, a control system 22 common to a plurality of systems, a flip-flop circuit 23 for supplying a mode switching signal to the ratio unit 21 and the control unit 22, a system A waiting timer circuit 24, a system B waiting timer circuit 25, a receiver 27, a microphone 28 and an antenna 26. The mode switching signal is obtained from the flip-flop circuit 23 in the form of an H or an L (low level) signal on the basis of output signals of and H (high level) according to the waiting timing of each system form the timer circuits 24 and 25.

FIG. 2 is a block diagram showing a specific example of a system underlying the basic principle of the stand-by system shown in FIG. 1 according to the present invention. The construction shown in FIG. 2 is actually a portable terminal including a digital cellular phone (hereinafter referred to as PDC) and PHS. Specifically, the portable terminal includes a common-to-PDC/PHS radio unit 31 including circuits corresponding to both PDC and PHS systems, a common-to-PDC/PHS radio unit 31 including circuits corresponding to both PDC and PHS systems, a common-to-PDC/PHS control unit 32 including circuits corresponding to both PDC and PHS systems, a flip-flop circuit 33, a PDC waiting timer circuit 34, a PHS waiting timer circuit 35, and antenna 36, a receiver 37 and a microphone 38. The flip-flop circuit 33 receives the H signal and provides the L or H signal. The PDC waiting timer circuit 34 provides the H signal to the flip-flop circuit 33 in PDC waiting timing. The PHS waiting timer circuit 35 provides the H signal to the flip-flop circuit 33 in PHS waiting timing. The antenna 36 transmits and receives PDC and PHS radio waves.

The operation of the portable terminal shown in FIG. 2 will now be described with reference to the timing chart shown in FIG. 3. The common-to-PDC/PHS radio and control units 31 and 32 switches the PDC and PHS systems according to the mode switching signal from the flip-flop circuit 33. When the flip-flop circuit 33 receives the H signal from the PDC or PHS waiting timer circuit 34 and 35, it provides an "H"-to-"L" or "L"-to-"H" mode switching signal to the common-to-PDC/PHS and common-to-PDC/PHS radio and control units 31 and 32. After the power supply to the portable terminal has been turned on, the PDC and PHS waiting timer circuits 34 and 35 generate a system switching timing signal for switching the PDC and PHS systems according to data (not shown) obtained in a position registrating operation.

FIGS. 3(a) to 3(d) show output signals of the PDC and PHS waiting timer circuits 34 and 35 shown in FIG. 2. As shown in FIGS. 3(a) and 3(c), the output signal of the PDC waiting timer circuit 34 is inverted to "H" in a cycle of 720 msec. On the other hand, as shown in FIGS. 3(b) and 3(d), the output signal of the PHS waiting timer 35 is inverted to "H" in a cycle of 1,200 msec. (i.e., 1.2 sec.). In the case of FIGS. 3(a) and 3(b), the two signals are deviated in timing from each other, while in the case of FIGS. 3(c) and 3(d) they are in synchronized timing.

Where the PDC and PHS waiting timings are deviated from each other as shown in FIGS. 3(a) and 3(b), the flip-flop circuit 33 provides the H or L signal according to the H signal outputs of the PDC and PHS waiting timer circuits 34 and 35. In this way, the circuit 33 switches the PDC and PHS systems at shot intervals to permit stand-by in both the systems.

On the other hand, where the PDC and PHS stand-by timings are coincident with each other as shown in FIGS. 3(c) and 3(d), the two signals overlap in timing for every 3600 msec. (i.e., 3.6 sec.), which is the least common multiple of 720 and 1,200 msec. In case when the two signal timings overlap, it is necessary to select either PDC or PHS system. However, the base stations of both the PDC and PHS systems recurrently send out data until the portable terminal correctly receives arrival data. Thus, when the portable terminal once fails to receive arrival data, it can receive the data in the next timing.

In the above embodiment, it is possible to simplify the construction of the entire system by arranging such that among the constituent elements of both the PDC and PHS systems those irrelevant to the frequency, for instance constituent elements in the radio and control units, are common to both the systems.

While the embodiment described above has been the portable terminal adopting the stand-by system according to the present invention, a person having ordinary knowledge in the art will readily understand that the above embodiment is by no means limitative and various changes and modifications may be made without departing from the scope of the present invention. For example, while the above embodiment has been described in connection with the PDC and PHS systems, the present invention is, of course, applicable to other systems as well. Also, the switching of two systems is by no means limitative, and the present invention is also applicable to the switching of three or more systems.

As has been described in the foregoing, in the stand-by system according to the present invention the user can do stand-by in the plurality of systems and, thus, can make utmost use of the merits of each system in dependence on the place and situations of use. In addition, the utilizer does not need selecting one of the plurality of systems for the stand-by, and, thus, can effectively utilize the plurality of contracted (or subscribed) systems.

A further pronounced effect obtainable is that it is possible to construct the radio and control units to be common to a plurality of systems, which is desired from the standpoint of the size and weight reduction, price reduction and reduction of power consumption of the portable terminal.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A stand-by system adopted in a portable terminal, comprising:
    a common antenna for transmitting and receiving data to and from a plurality of systems; and
    a waiting control circuit for providing a mode switching signal to said plurality of systems to render these systems to be in a stand-by state at the same time.

2. The stand-by system of claim 1, wherein said waiting control circuit further provides timing signals corresponding to each of the plurality of systems.

3. The stand-by system of claim 2, wherein the plurality of systems each have a radio unit and a control unit, these units being common to at least two of the systems.

4. The stand-by system of claim 1, wherein the plurality of systems comprises one of a digital cellular phone (PDC) system and a personal handy phone (PHS) system.

5. The stand-by system of claim 1, wherein said waiting control circuit comprises:
 a plurality of waiting timer circuits each for generating a waiting timing signal corresponding to each of the plurality of systems; and
 a flip-flop circuit for receiving the waiting timing signals and providing corresponding mode switching signals.

6. The stand-by system of claim 5, wherein the waiting timer circuits provide timing signals in cycles of 720 and 1,200 msec.

7. The stand-by system of claim 1, wherein when a plurality of waiting timing signals are coincident in timing, the system performs the operation until the system can receive the data in the next timing.

8. A stand-by system for a plurality of systems comprising:
 a radio unit common to the plurality of systems;
 a control unit common to the plurality of systems;
 timing signal generating means for generating a plurality of waiting timing signals for the plurality of systems; and
 mode selecting means for generating a mode selection signal to select a system function of the plurality of systems in the radio unit and the control unit on the basis of the waiting timing signals from the timing signal generating means for placing at least two of the plurality of systems into a stand-by state at the same time.

9. The stand-by system of claim 8, wherein the mode selecting means comprises a flip-flop circuit which receives the waiting timing signals and generates the corresponding mode selection signal.

10. The stand-by system of claim 8, wherein the mode selecting means comprises a flip-flop circuit.

11. The stand-by system of claim 8, wherein the plurality of systems comprises one of a digital cellular phone (PDC) system and a personal handy phone (PHS) system.

12. A stand-by system for a plurality of systems comprising:
 a body comprising:
  a radio unit common to the plurality of systems;
  a control unit common to the plurality of systems;
  timing signal generating means for generating a plurality of waiting timing
  signals for the plurality of systems;
  mode selecting means for generating a mode selection signal to select a system function of the plurality of systems in the radio unit and the control unit on the basis of the waiting timing signals from the timing signal generating means for placing at least two of the plurality of systems into a stand-by state at the same time;
 a receiver operably connected to said body;
 a microphone operably connected to said body; and
 an antenna operably connected to said body.

13. The stand-by system of claim 8, wherein when said plurality of waiting timing signals are coincident in timing, the system performs an operation until it can receive data in a next timing.

14. The stand-by system of claim 12, wherein when said plurality of waiting timing signals are coincident in timing, the system performs an operation until the system can receive data in a next timing.

15. A portable terminal comprising:
 a radio system for transmitting and receiving from a plurality of communication systems; and
 a waiting control circuit in communication with said radio system that generates a mode switching signal,
 wherein said radio system is responsive to said mode switching signal to perform a stand-by function for each of said plurality of communication systems at the same time.

16. The terminal of claim 15, wherein said radio system switches between said plurality of communications systems in response to said mode switching signal.

17. The terminal of claim 15, wherein said radio system comprises:
 a radio unit in communication with said waiting control circuit; and
 a control unit in communication with said waiting control circuit and said radio unit.

18. The terminal of claim 15, wherein said waiting control circuit comprises:
 a flip-flop circuit in communication with said radio system;
 a first waiting timing circuit in communication with said flip-flop which provides a waiting timing signal for a first of said plurality of communication systems; and
 a second waiting timing circuit in communication with said flip-flop which provides a waiting timing signal for a second of said plurality of communication systems.

19. The terminal of claim 15, wherein one of said plurality of communication systems comprises a digital cellular phone (PDC) system.

20. The terminal of claim 15, wherein one of said plurality of communication systems comprises a personal handy phone (PHS) system.

* * * * *